J. B. MAYZEL.
BOLTLESS RAIL JOINT CONNECTION.
APPLICATION FILED OCT. 24, 1914.
1,205,129.
Patented Nov. 14, 1916.
2 SHEETS—SHEET 1.
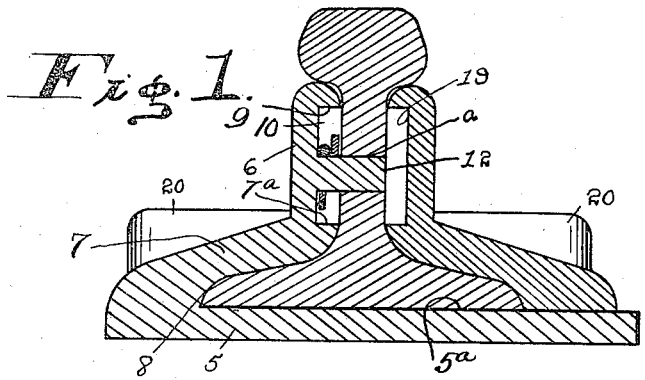
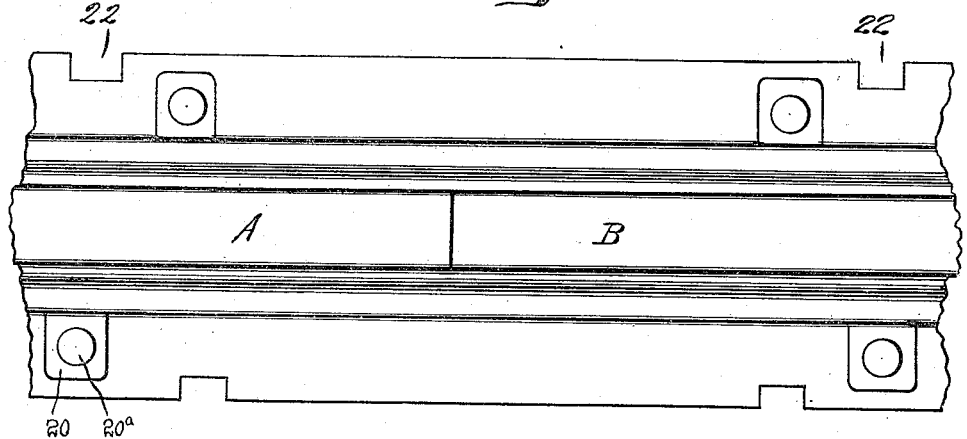
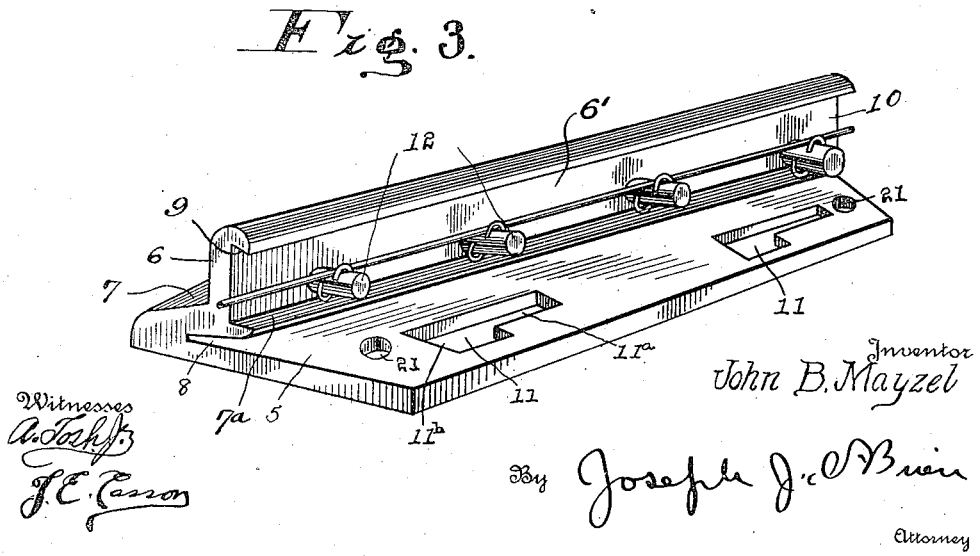
Inventor
John B. Mayzel J. B. MAYZEL.
BOLTLESS RAIL JOINT CONNECTION.
APPLICATION FILED OCT. 24, 1914.
1,205,129.
Patented Nov. 14, 1916.
2 SHEETS—SHEET 2.
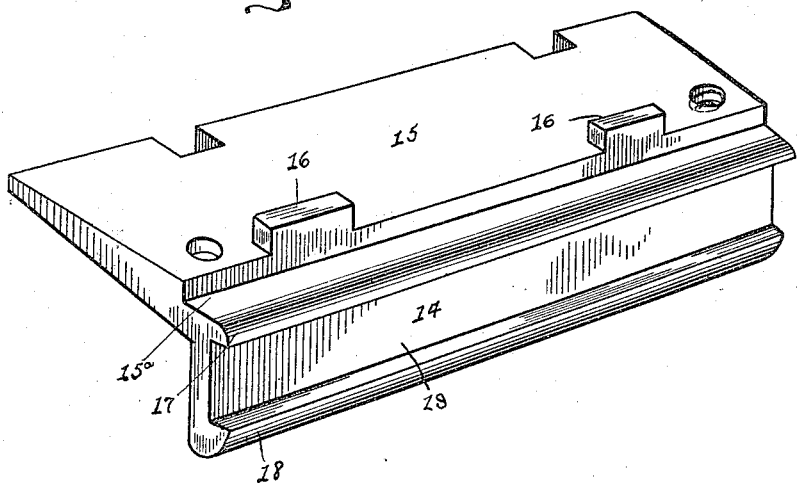
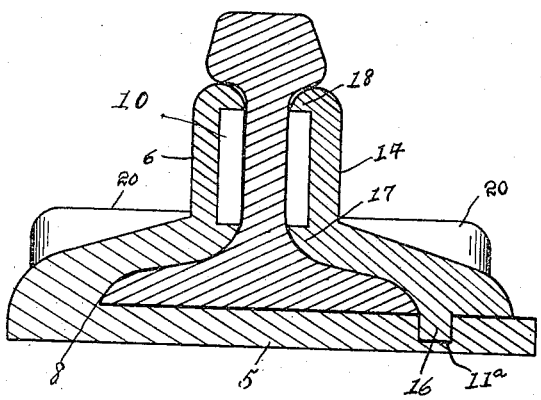
Inventor
John B. Mayzel
Witnesses
By Joseph J. O'Brien
Attorney

UNITED STATES PATENT OFFICE.

JOHN B. MAYZEL, OF PASSAIC, NEW JERSEY.

BOLTLESS RAIL-JOINT CONNECTION.

1,205,129.          Specification of Letters Patent.      Patented Nov. 14, 1916.

Application filed October 24, 1914. Serial No. 868,528.

*To all whom it may concern:*

Be it known that I, JOHN B. MAYZEL, a citizen of the United States, residing at Passaic, in the county of Passaic and State of New Jersey, have invented certain new and useful Improvements in Boltless Rail-Joint Connections, of which the following is a specification.

This invention relates to improvements in rail joints, and its leading object is to provide a joint construction, in which the meeting ends of the rails are locked to fish plates and a base plate without bolts and nuts, and in such a manner that the pressure of the rolling stock moving on the rails will cause the connecting parts or elements to bind each other more effectively, thus converting the pressure of the rolling stock into a constructive force, acting to maintain, instead of disrupt the joint.

Another object of the invention is to provide a rail joint construction which will permit of the completion of a joint in a minimum period of time and with a minimum expenditure of labor.

A still further object of the invention is the provision of a joint construction with a base plate having an integral fish plate and constructed to interlock with the meeting ends of the rails without the use of connecting bolts and nuts, and a second fish plate constructed to interlock with the base and adapted to hold the meeting ends of the rails united to the base plate.

A still further object of the invention is to provide a joint construction in which opposing fish plates are interlocked with the rail ends and connected with the base plate, in such a manner that the pressure of the rolling stock upon the rails is transmitted directly to the fish plates and is utilized to hold the parts united, the fish plates engaging the heads of the rails.

With the above and other objects in view the invention comprises certain new and useful constructions, combinations and arrangements of parts and elements, clearly described in the following specification and clearly illustrated in the accompanying drawings, in which:—

Figure 1 is a cross sectional view of the improved rail joint, the elements being shown in connected positions. Fig. 2 is a top plan view thereof. Fig. 3 is a perspective view of the base plate and the fish or joint plate integral therewith. Fig. 4 is a bottom view, in perspective, of the detachable fish plate. Fig. 5 is another cross sectional view, showing the interlocking connection between the base plate and the detachable fish or joint plate.

Referring to the accompanying drawings, illustrating the preferred embodiment of the invention, 5 designates the base plate, which is designed to lie on the ties under the meeting ends of the rails; and which has a flat upper surface $5^a$ to receive the flat base of the rail ends A, and B.

The base plate 5 is formed with an upstanding joint bridging element or fish plate 6, which is constructed integrally with said base plate by any method desired. The fish or joint bridging element or plate 6 has a base 7, which is adapted to seat on the wings of the rail end bases, and the base portion 7 of the fish plate 6 is supported above the base face $5^a$ of the base plate 5 so that a longitudinal groove or channel 8 is formed between the base portion 7 of the fish plate 6 and the base plate, which has a form corresponding to the cross sectional form of the side flanges of the rail ends, so that one base flange of each rail end will snugly fit into said groove or channel 8. The fish plate 6 is also formed with a longitudinal extension $7^a$, which projects inwardly from the base portion 7, so as to abut the side faces of the rail webs. The upper portion of the fish plate 6 is formed with a longitudinal shelf 9, which has a convex upper surface to engage the under face of the heads of the rail ends, and which projects inwardly to engage the side faces of the rail webs. The central longitudinal portion 6′ of the fish plate is spaced by the extension $7^a$ and the shelf 9 from the side faces of the rail webs to provide a longitudinal channel or groove 10, which functions to maintain a spaced two-point contact between the fish plate and the rail ends.

The base plate 5 is formed with a plurality of bolt or lug recesses 11, which are longitudinally spaced from each other. The lug recesses 11 do not extend through the base plate. Two bolt or lug recesses 11 are shown, but a greater number may be employed without modifying the basic plan of construction. Each opening is shown substantially L-shaped in construction, with parallel side faces, which side faces are also parallel to the direction of the base flanges of the rails. Each recess 11 has a narrow end portion 11ª, which constitutes the locking end, and a wider end portion 11ᵇ, which constitutes the entrance end. The inner side of each recess is adapted to lie substantially flush with the side edge portions of the base flanges of the rail ends, and the entrance end of each bolt recess is located nearer the outer edge of the base plate than the fish plate, or faces away from the fish plate.

In each rail an opening $a$ is formed and the integral fish plate 6 is formed with integral pins 12, which are adapted to enter the openings $a$. The meeting ends of the rails are positioned on the base plate and the side base flanges thereof are advanced into the longitudinal channel 8, and at the same time the pins 12 are interlocked with the openings $a$ of the rail ends. All points of contact are designed to be snug, so that a non-yielding engagement is provided between the rail ends and the base and integral fish plate.

The detachable fish plate 14 has a base flange 15, which is designed to snugly seat on the base flanges of the rail ends and on the upper face of the base plate 5, and for this purpose is formed with a longitudinal recess 15ª to receive the base flanges of the rail ends. The detachable fish plate 14 is also formed with integral bolt lugs 16 which are shown to be substantially oblong in form and which are designed to snugly fit in the locking ends of the recesses 11, the lugs 16 being just wide enough to enter the openings 11ª. The fish plate 14 is also formed with a longitudinal extension 17, which is adapted to engage the side faces of the rail ends, and with a shelf extension 18, which is adapted to contact with the under faces of the rail heads, the extensions 17 and 18 being spaced apart to form a longitudinal channel 19.

After the rail ends are in proper positions against the integral fish plate the detachable fish plate 14 is moved to its proper position. This is done by placing the fish plate 14 over the base plate 5 so that the integral locking lugs 16 will lie directly over the entrance ends 11ᵇ of the recesses 11, when the lugs may be forced into said recesses 11 and the fish plate 14 moved longitudinally on the base plate 5 so that the lugs 16 will enter the locking ends 11ª of the openings 11 and be forced thereby into snug locking contact with the rail ends.

Each fish plate is formed with an integral pair of bolt lugs 20, located on the base portions thereof, and provided with bolt openings 20ª extending vertically therethrough. The openings 20ª are adapted to register with openings 21 formed in the base plate 5. Spike recesses 22 are formed in the base plate 5 on the side which carries the fish plate 6.

By the engagement of the fish plates and the rail heads, the pressure exerted by the rolling stock at the joint between the meeting ends of the rails is distributed on the fish plates, so that the greater the pressure the more positively will the fish plates hug the rails and the more effectively will the connection hold. The fish plates are held in position by connections with the base at the points of least strain and movement, and the connecting bolts run vertically, so that they positively act to hold the movable parts together, or to hold the joint connection in its normal tractive position. The lugs 20 serve to reinforce the fish plates, and act to support said fish plates against lateral body yielding. The locking bolt lugs and their coöperating openings are completely covered by the base portion of the detachable fish plate, and are thus protected against the elements and from wilful tampering. The inner longitudinal channels of the fish plates are designed to receive the signal wires, and on the lateral pins spring washers 25 are positioned to hold the signal wires in place.

Having described my invention I claim and desire to secure by Letters Patent:—

1. A rail joint construction consisting of a base plate formed with an integral fish plate, said fish plate having lateral pins rigidly connected thereto, said base plate having a longitudinal recess, the inner edge portion of said recess being in parellelism with the fish plate and the width of said recess being reduced from the inner edge portion thereof, said lateral pins being capable of entering the transverse bolt openings in the rails, and a detachable fish plate formed with an integral locking lug adapted to enter said recess and hold said detachable fish plate against the rails and the rails against the integral fish plate, said locking lug being covered by the detachable fish plate and the base plate.

2. A rail joint connection consisting of a base plate adapted to lie under the meeting ends of a pair of rails and extend laterally thereof and formed with an integral fish plate having integral lateral pins capable of entering the transverse bolt openings of the rail ends, said base plate having longitudinally extending locking recesses spaced from each other, each recess extending partly through the base plate and being substantially L-shaped in plan, the integral fish plate being adapted to seat on the base flanges of the rail ends, and a detachable fish plate positionable on the base plate and against the sides and on the base flanges of the rails, said detachable fish plate being formed with integral locking lugs rectangular in form and adapted to enter said locking recesses and confine the rail ends between said detachable fish plate and said integral fish plate, the locking lugs being of less length than the locking recesses and being movable lengthwise therein, said lugs being insertible in the wider portions of the L-shaped recesses and being then movable into the narrower portions thereof, said lugs and said recesses being protected from above by the base of the detachable fish plate and from below by the base plate.

In testimony whereof I affix my signature in presence of two witnesses.

JOHN B. MAYZEL.

Witnesses:
JOSEPH J. O'BRIEN,
S. W. COCKRELL.

Copies of this patent may be obtained for five cents each, by addressing the "Commissioner of Patents, Washington, D. C."